United States Patent [19]
Watanabe et al.

[11] Patent Number: 6,097,538
[45] Date of Patent: Aug. 1, 2000

[54] LENS BARREL FOR USE IN A MICROSCOPE

[75] Inventors: Akira Watanabe, Hanno; Shunichi Kubota, Hino, both of Japan

[73] Assignee: Olympus Optical Co., Ltd., Tokyo, Japan

[21] Appl. No.: 09/243,307

[22] Filed: Feb. 2, 1999

[30] Foreign Application Priority Data

Feb. 3, 1998 [JP] Japan .................................. 10-022146

[51] Int. Cl.[7] ............................ G02B 21/06; G02B 21/00
[52] U.S. Cl. ........................ 359/390; 359/368; 359/375; 359/385
[58] Field of Search .................................. 359/362–363, 359/368–390, 817–821

[56] References Cited

U.S. PATENT DOCUMENTS

| | | | |
|---|---|---|---|
| 4,210,384 | 7/1980 | Meyer et al. | 359/385 |
| 4,518,230 | 5/1985 | Weber | 359/363 |
| 4,685,776 | 8/1987 | Inoue et al. | 359/363 |
| 5,095,887 | 3/1992 | Leon et al. | 359/375 |
| 5,896,224 | 4/1999 | Kapitza | 359/385 |

FOREIGN PATENT DOCUMENTS 5-45591  2/1993  Japan .

*Primary Examiner*—Thong Nguyen
*Attorney, Agent, or Firm*—Frishauf, Holtz, Goodman, Langer & Chick, P.C.

[57] ABSTRACT

An observation lens barrel for use in a microscope, comprising a main body for receiving a light beam applied from the microscope and including an image to be observed, an observation optical system provided in the main body and extending at right angles to a direction in which the light beam from the microscope is focused, and optical elements provided in the main body, for receiving the light beam from the microscope and emitting a light beam to the observation optical system. The main body has a first port and a second port. The first port is provided on a side opposing the microscope, with the optical elements located between the first port and the microscope. The second port is provided on a side opposing the observation optical system, with the optical elements located between the second port and the observation optical system. The optical elements include an optical element which guides at least the light beam applied from the microscope, to the first port, and which guides, to the observation optical system, a light beam applied from the second port, which crosses the light beam guided to the first port.

15 Claims, 5 Drawing Sheets

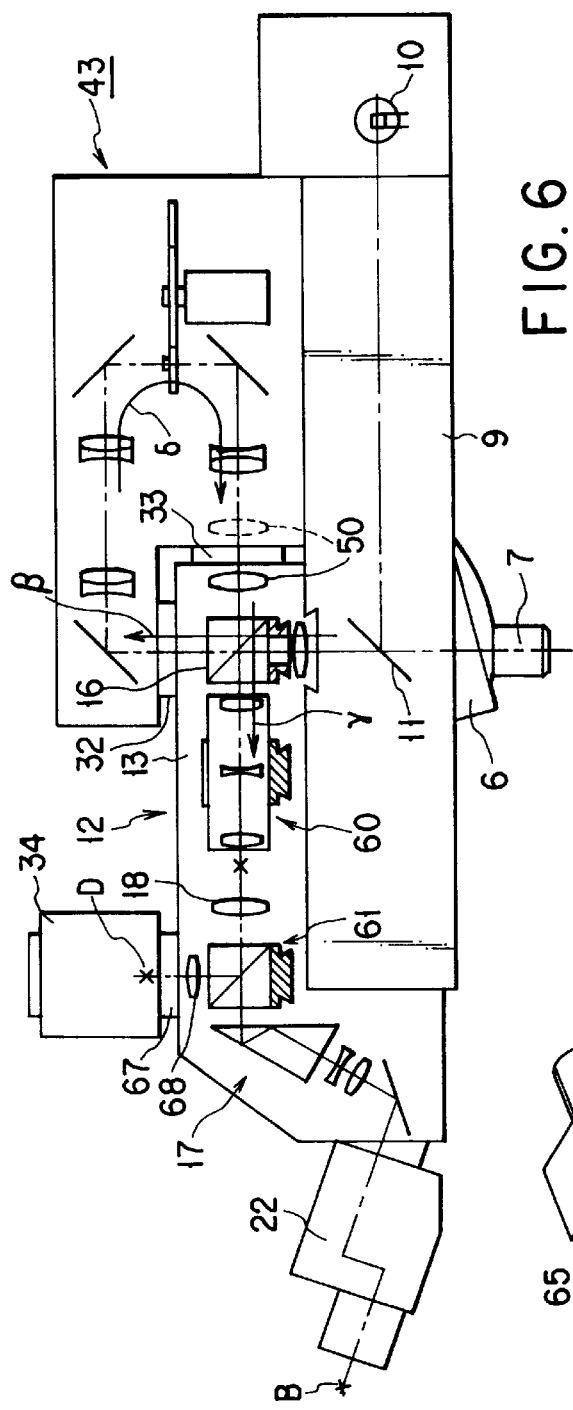
FIG. 6
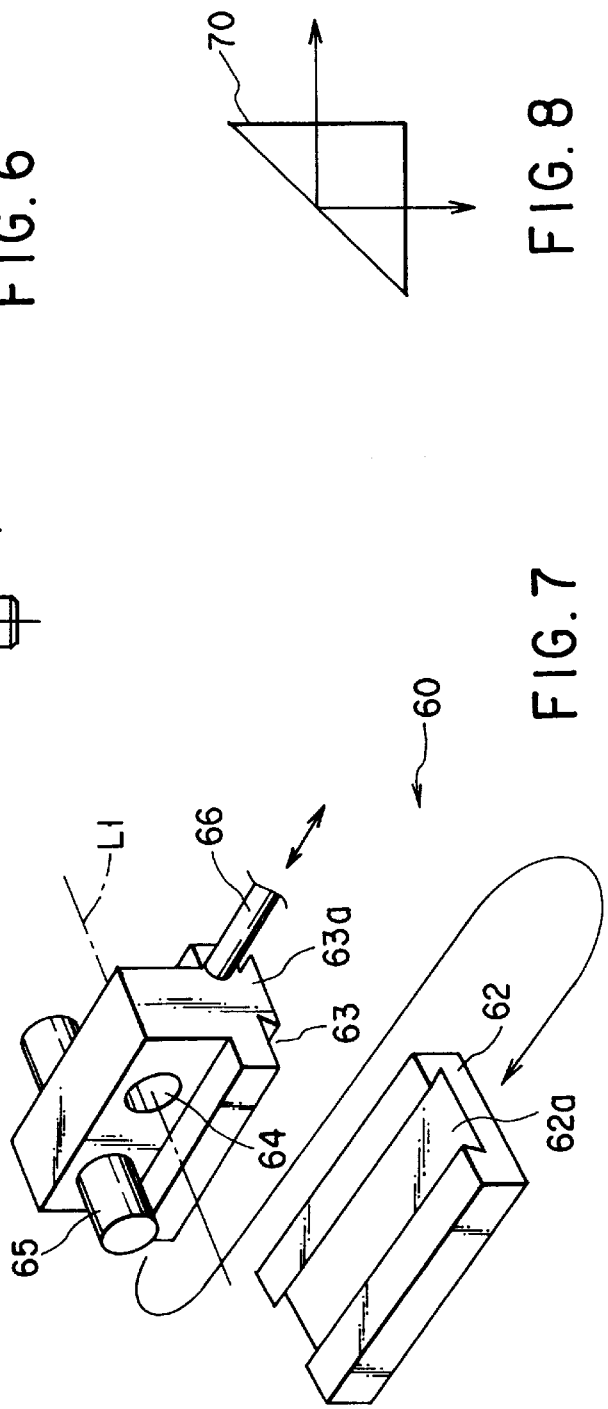
FIG. 8
FIG. 7

LENS BARREL FOR USE IN A MICROSCOPE

BACKGROUND OF THE INVENTION

The present invention relates to an observation lens barrel for use in a microscope.

Generally, a microscope has a main body and an observation lens barrel attached to the main body.

The main body of the microscope has a stage for holding an object of observation and an objective lens set in opposition to the stage. The observation lens barrel is designed to guide the image of the object passing through the objective lens, selectively to, for example, the ocular lens or a photographing unit.

Recently, it is increasingly demanded that various auxiliary units, each having a special optical system, be attached to the observation lens barrel in accordance with the type of the object of observation. Among such auxiliary units are a scale-projecting unit and a looped optical path unit. The scale-projecting unit forms an image of a scale in the image of the object. The looped optical path unit achieves confocal observation of the object.

If the function of the lens barrel of the microscope is expanded so that various auxiliary units may be attached to the lens barrel, special optical systems must be incorporated into the lens barrel. However, this causes a problem in that the lens barrel will inevitably become taller and larger.

The present invention has been made in view of the foregoing. Its object is to provide a lens barrel for use in a microscope, which is small and can be readily expanded in function to hold various auxiliary units.

BRIEF SUMMARY OF THE INVENTION

The present invention provides a structure which makes it possible to attach additional units, including a TV camera unit, a looped optical path unit, a reticle-projecting unit, and the like, without increasing the height of the lens barrel.

According to this invention there is provided an observation lens barrel (12) for use in a microscope (2), comprising: a main body (13) for receiving a light beam applied from the microscope (2) and including an image to be observed; an observation optical system (17) provided in the main body (13) and extending at right angles to a direction in which the light beam from the microscope (2) is focused; and optical elements (16, 27 to 29) provided in the main body (13), for receiving the light beam from the microscope (2) and emitting a light beam to the observation optical system (17). The main body (13) has a first port (32) provided on a side opposing the microscope (2), with the optical elements located between the first port and the microscope, and a second port (33) provided on a side opposing the observation optical system, with the optical elements located between the second port and the observation optical system. The optical elements include an optical element (29) which guides at least the light beam applied from the microscope (2) to the first port (32) and which guides, to the observation optical system, a light beam applied from the second port (33), which crosses the light beam guided to the first port (32).

This structure makes it possible to attach various additional units, particularly a looped optical path unit, without increasing the height of the lens barrel. The looped optical path unit is attached, with its input and output ends connected to the first and second ports, respectively.

The first and second ports (32, 33) are designed for connection with an optical unit such as a looped optical path unit or a TV camera unit.

In another embodiment of the invention, the optical elements include a plurality of optical elements (27 to 29) held in the main body (13) to be switched from one to another. These optical elements (27 to 28) guide guiding all or part of the light beam applied from the microscope, to the observation optical system.

In still another embodiment, the optical elements include a plurality of optical elements (27 to 29) held in the main body (13) to be switched from one to another. These optical elements guide all or part of the light beam applied from the microscope, to the observation optical system, and includes an optical element (28) which guides the light beam applied from the second port (33), to the observation optical system (17).

In a further embodiment, the optical elements include a plurality of optical elements (27 to 29, 70) held in the main body (13) to be switched from one to another. The optical elements include an optical element (70) which guides, to the microscope, the light beam applied from the second port (33).

In an embodiment of the invention, another optical element (61) is provided between the optical elements (27 to 29, 70) and the observation optical system (17), both provided in the main body (13). The other optical element (61) branches, from the main body (13), the light beam guided into the observation optical system. A third port is provided on a side of the main body, for allowing passage of the light beam branched by the optical element.

In another embodiment, a magnification-change optical system (60) is provided in the main body (13). It is desirable to arrange the magnification-change system (60) between the optical element (16) and the other optical element (61).

In a further embodiment, imaging lenses (15, 50) are provided at an incident side of the optical element (16), and the magnification-change optical system (60) is designed to form an image at the same image-forming position of the imaging lenses.

In a still another embodiment, imaging lenses (15, 50) are provided at an incident side of the optical element (16), for focusing a light beam which has passed an infinity objective lens provided in the microscope.

According to another aspect of the invention, there is provided an observation lens barrel (12) to be attached to a microscope (2), which comprises: a main body (13) for receiving a light beam applied from the microscope and including an image to be observed; an observation optical system (17) provided in the main body (13) and extending at right angles to a direction in which the light beam from the microscope is focused; and a looped optical path unit (43) for guiding the light beam from the microscope in a looped path, to the observation optical system, while making the light beam cross the light beam from the microscope.

The other advantages of the present invention will be understood from the following description of the embodiments and by reference to the accompanying drawings.

BRIEF DESCRIPTION OF SEVERAL VIEWS OF THE DRAWING

FIG. 6 is schematic representation of the second embodiment of this invention;

FIG. 7 is perspective view of a magnification-change optical unity;

FIG. 8 is a diagram of an optical element used in the third embodiment of the present invention;

DETAILED DESCRIPTION OF THE INVENTION

Several embodiments of this invention will be described, with reference to the accompanying drawings.

First Embodiment

Figure 1:
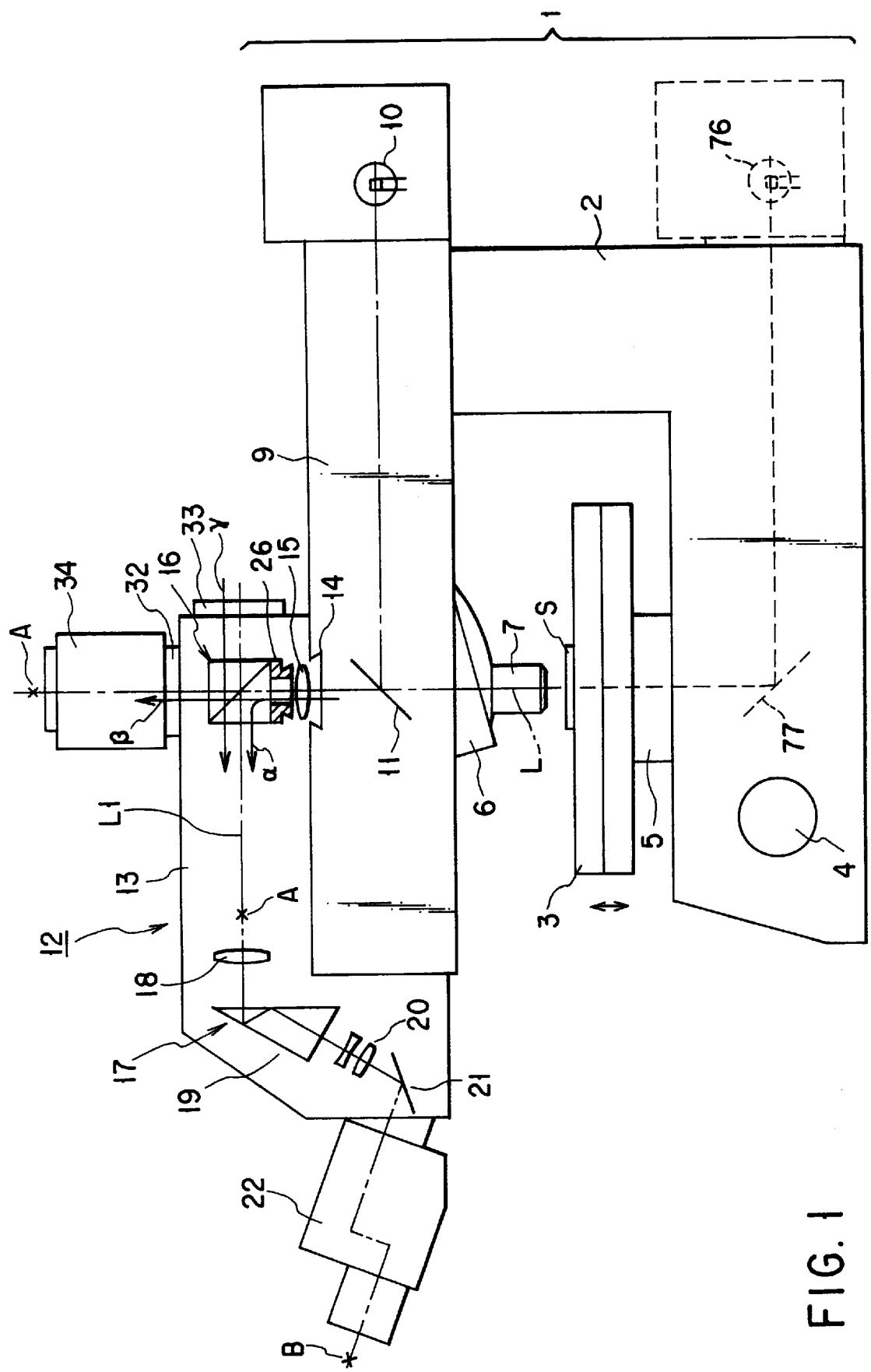
FIG. 1 is a schematic representation of the first embodiment of the present invention.

FIG. 1 is a schematic representation of a microscope for performing, for instance, incident-light observation, which is one embodiment of the present invention.

The microscope 1 has a microscope main body 2. The main body 2 has a stage 3 for holding a sample S. The stage 3 can be moved up and down to a desired position, by means of a stage drive section 5 which is operated by turning a sighting handle 4.

A revolver 6 holding a plurality of objective lenses 7 is provided, opposing the stage 3 of the microscope main body 2. The revolver 6 can be rotated to position one objective lens 7 of a prescribed magnification, in the optical path (L) of the microscope. The revolver 6 may be designed to be driven up and down.

An incident-light illumination tube 9 is provided on the top of the microscope main body 2. The tube 9 applies illumination light to the sample S held on the stage 3. A lamp light source 10 is attached to one end of the incident-light illumination tube 9 and located outside the microscope main body 2. An extinction filter (ND), an aperture diaphragm (AS) and a field diaphragm (FS), not shown, are arranged, in the order mentioned, on the optical path extending from the lamp light source 10 and passing through the incident-light illumination tube 9.

The illumination light, which has passed through the incident-light illumination tube 9, is guided downwardly by an incident-light cube 11 (half mirror) and reaches the sample S after passing through the objective lens 7. The image of the sample S propagates through the objective lens 7, passes straight through the incident-light cube 11, and enters an observation lens barrel 12 secured to the microscope main body 2, along a line almost perpendicular to the observation lens barrel 12.

The observation lens barrel 12 comprises a barrel body 13. The barrel body 13 is attached to, and assumes an optical position with respect to, the microscope main body 2 by means of a circular cotter-seat assembly 14. The barrel body 13 contains an imaging lens 15, a first optical element unit 16, and a binocular observation optical unit 17. The unit 16 controls the direction of the light beam coming through the imaging lens 15, to a direction, β direction, or γ direction. The optical system 17 enables users to observe, with naked eyes, the optical images guided in the a direction and the γ direction, respectively. The binocular observation optical unit 17 comprises a first relay lens 18, a triangular prism 19, a second relay lens 20, a reflecting mirror 21, and a binocular section 22, which are arranged along an optical path (L1) in the order mentioned. The triangular prism 19 is provided to adjust the position of the image and to alter the orientation of the image. The optical unit 17 forms the image formed at equivalent positions by the imaging lens 15, again at position B.

Figure 2A:
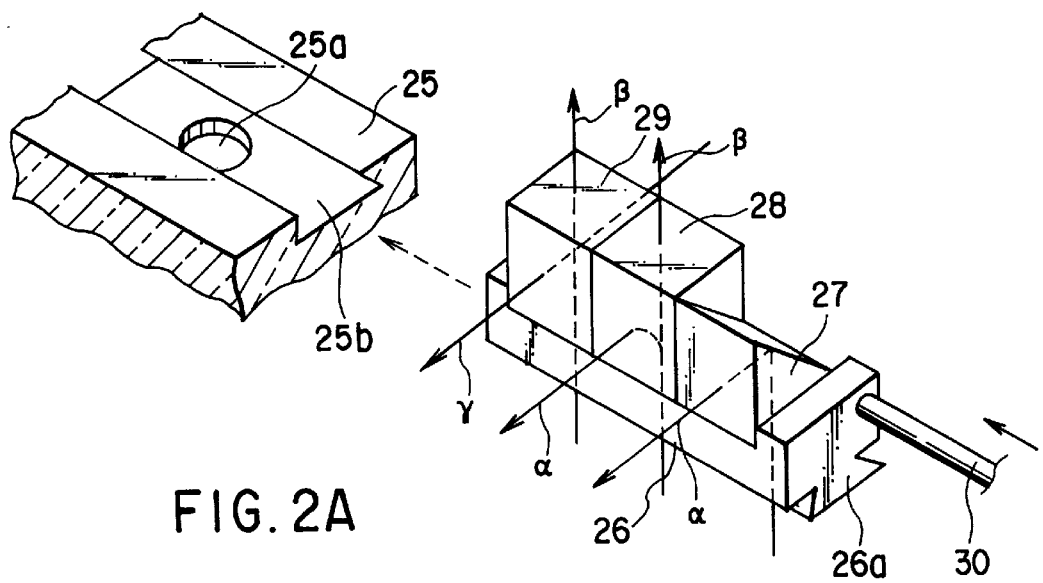
FIGS. 2A to 2D are diagrams showing the optical element unit and the optical elements provided in the optical element unit.

FIG. 2A is a magnified, perspective view of the first optical element unit 16. The first optical element unit 16 has a base 25, a movable base 26, first to third optical elements 27 to 29, and a drive knob 30. The base 25 has a through hole 25a that allows passage of the incident light applied from the microscope main body 2. The movable base 26 has a parallel cotter 26a fitted in the parallel cotter seat 25b made in the base 25 and can move in the horizontal direction indicated by the arrows in FIG. 2A. The first to third optical elements 27 to 29 are mounted on and secured to the movable base 26. The drive knob 30 is used to drive the movable base 26 to bring one of the optical elements 27 to 29 to a position where the optical element opposes the through hole 25a.

The first optical element 27 is a total reflection prism (FIG. 2B), guiding the light applied from the microscope main body 2, in the α direction only. The second optical element 28 is a prism (FIG. 2C), distributing a predetermined amount of light in the α direction and a predetermined mount of light in the β direction. The third optical element 29 is a transmission prism (FIG. 2D), allowing the light from the main body 2 to propagate straight therethrough in the β direction and also allowing light in the γ direction to propagate straight therethrough.

As FIG. 1 shows, a first port 32 is mounted on the upper surface of the observation lens barrel 13, for allowing passage of the light guided in the β direction. A second port 33 is mounted on one side of the observation lens barrel 13, for allowing passage of the light guided in the γ direction.

Figures 2B, 2C, 2D:
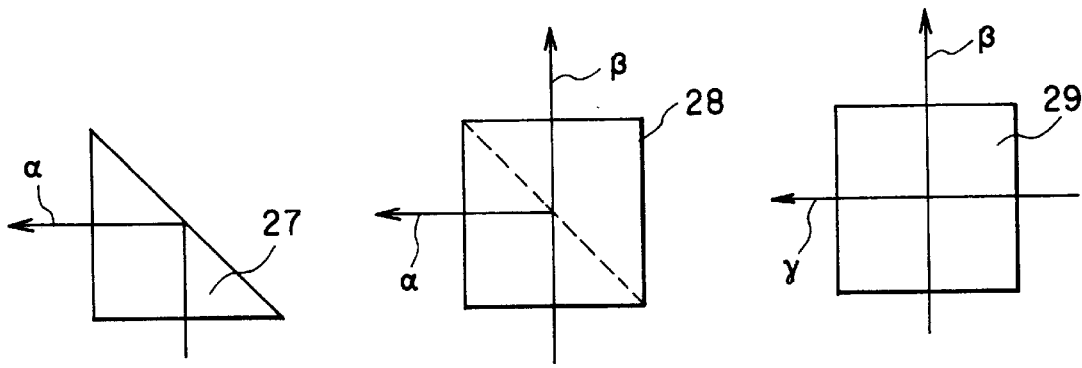

As shown in FIG. 1, a TV camera unit 34, for example, is attached to the first port 32. To use the TV camera unit 34, the first optical element unit 16 is operated to select and use the second optical element 28 (FIG. 2C). The TV camera unit 34 is attached by connecting the connector provided on the unit 34, with the adapter provided on the lens barrel 13. The adapter has the structure 35 shown in FIG. 3A, and the connector has the structure 36 shown in FIG. 3B.

Figures 3A, 3B:
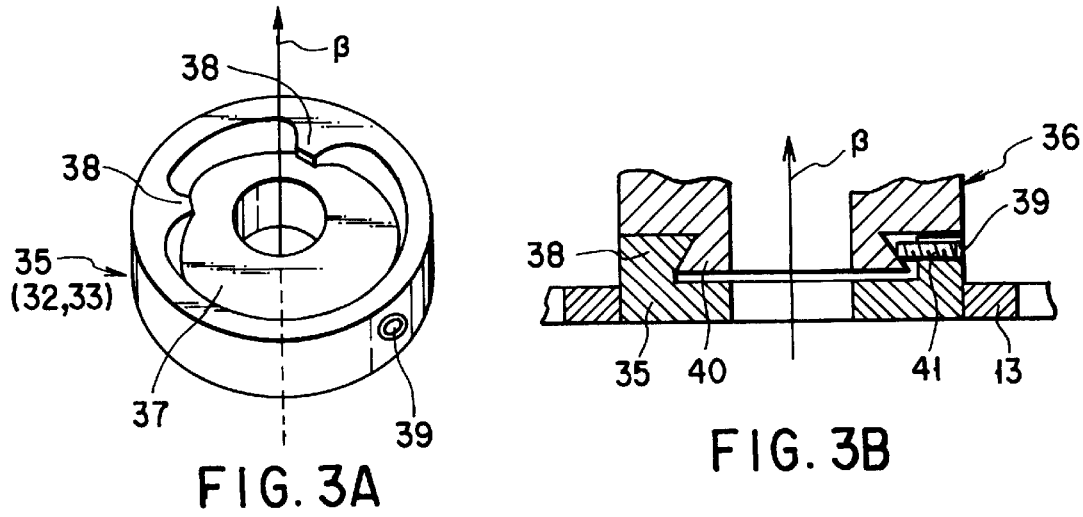
FIGS. 3A and 3B are a perspective view and a sectional view, showing the adapter/connector structure for attaching additional optical units, such as a TV camera, to the port of the lens barrel.

As depicted in FIG. 3A, the adapter 35 has circular recess 37 and two projections 38 that are spaced by 120° in circumferential direction. The adapter 35 also has a screw hole 39, which is spaced by 120° from the projections 38 and in which a machine bolt is to be inserted.

As shown in FIG. 3B, the connector 36 has a circular cotter 40, which has a smaller diameter than the circular recess 37. The machine bolt 41 inserted in the screw hole 39, pushing the cotter 40 toward the projections 38 and abutting the cotter 40, in part, on the projections 38. The connector 36 and the adapter 36 are thereby positioned.

Figure 4:
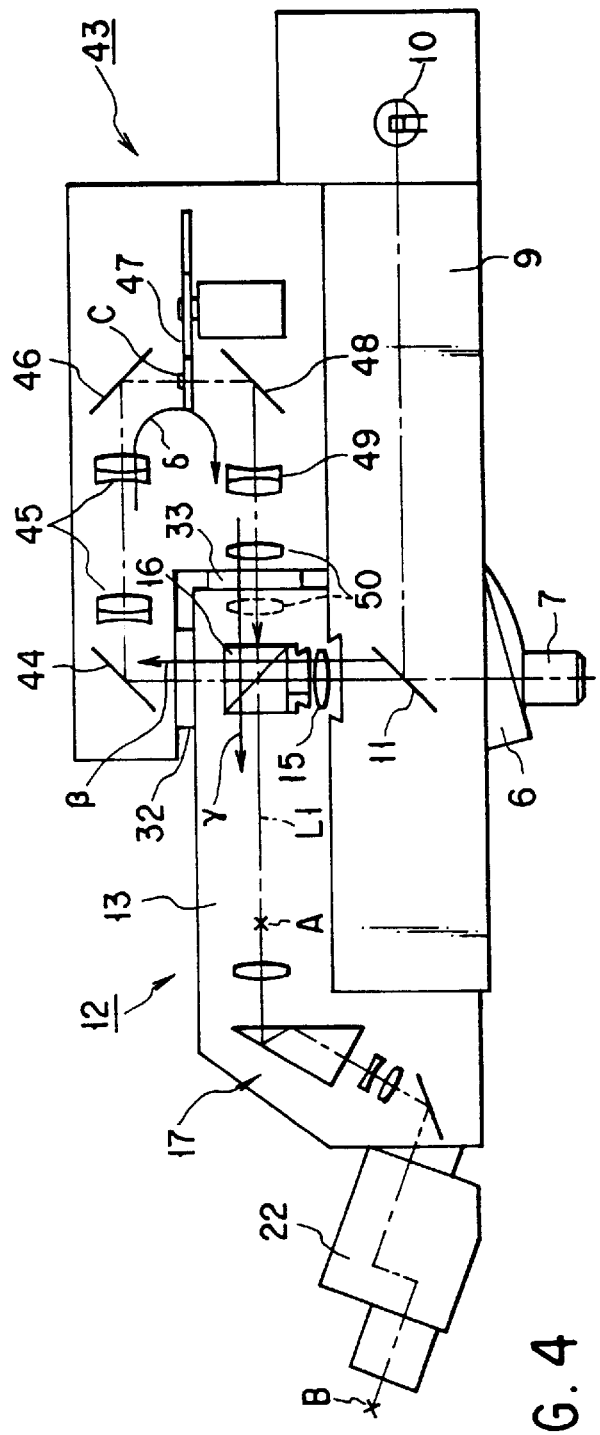
FIG. 4 is a schematic view of the lens barrel to which a looped optical path unit is attached.

The second port 33 is used to utilize a looped optical path unit 43, as is illustrated in FIG. 4. To use the looped optical path unit 43, the first optical element unit 16 is operated to select the third optical element 29 (FIG. 2D). The path unit 43 guides the light propagating in the β direction, through the first port 32 in δ direction, and further guides the light through the second port 33 in the γ direction, back into the observation lens barrel 13.

More specifically, in the looped optical path unit 43, the first mirror 44 reflects the light coming from the first port 32, guiding the light through the confocal optical system 45. Then, the second mirror 46 reflects the light, which is focused on a pinhole disc 47 (point C), thereby forming a confocal image. In the looped optical path unit 43, the third mirror 48 reflects the confocal image. The confocal image passes through a confocal optical system 49, forming parallel light beams. The parallel light beams pass through the imaging lens 50 and are guided into the observation lens barrel 13.

As shown in this figure, the looped optical path unit 43 and the lens barrel 13 are connected at the first port 32 and second port 33, which are mounted on the upper surface and side of the lens barrel 13, respectively. It is therefore impossible to use components similar to the adapter 35 and the connector 36, shown in FIGS. 3A and 3B. Hence, only the sort 32 is connected by components similar to those shown in FIGS. 3A and 3B, and the other port 33 is connected by means a different connecting component.

Figure 5:
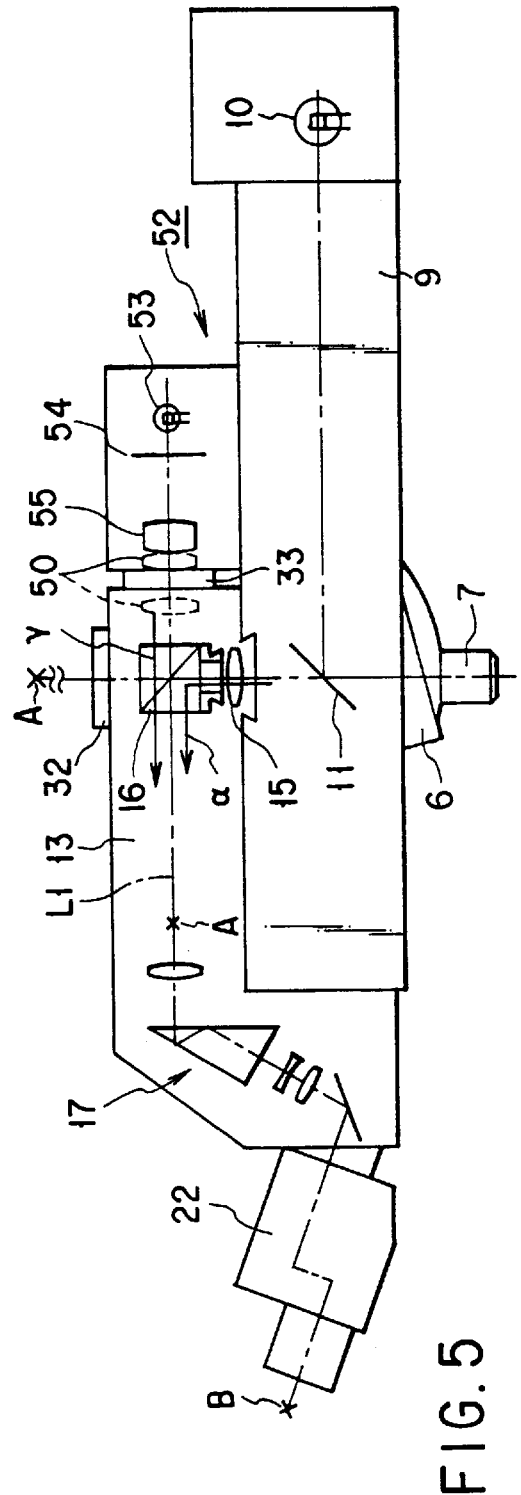
FIG. 5 is a schematic view of the lens barrel to which a reticle-projecting unit is attached.

A reticle-projecting unit 52 can be attached to the second port 33 of the observation lens barrel as is illustrated in FIG. 5. The reticle-projecting unit 52 has a light source 53, a reticle 54 such as a scale, and an optical system 55. An image of the reticle 54 illuminated by the light source 53 is applied into the lens barrel 13 from the second port 33 through the optical system 55.

The image of the scale, thus projected from the reticle projecting unit 52 is synthesized with the image observed through the first optical element unit 16. The synthesized image is guided to the observation optical unit (the binocular section 22). The scale enables the observer to recognize the size of the image being observed.

The observation lens barrel 13 having the structure described above is advantageous in the following respects.

Any additional units, such as the TV camera unit 34 shown in FIG. 1, the looped optical path unit 43 shown in FIG. 4, and the reticle-projecting unit 52 shown in FIG. 5, can be attached to the lens barrel 13, without increasing the height of the lens barrel. Even the optical path unit 43 shown in FIG. 4, in particular, can be attached to the lens barrel 13 without providing any specific structure in the lens barrel 13, that is, without increasing the height of the lens barrel 13. This is because the lens barrel 13 has first and second ports 32 and 33, which make the optical axes β and γ intersect with each other at right angles in the looped optical path unit 43 (see FIG. 4). This helps to provide a microscope, which is small and can be readily expanded in terms of function.

Further, the image of a reticle such as a scale can be displayed, superimposed on the image being observed, merely by attaching the reticle-projecting unit 52 to the second port 33 of the lens barrel. It is therefore possible to present images that serve high-precision microscopic observation.

Second Embodiment

The second embodiment of this invention will be described, with reference to FIGS. 6 and 7. The components of the second embodiment, similar to those of the first embodiment, are designated at the same reference numerals and will not be described in detail.

In the second embodiment, as shown in FIG. 6, a magnification-change optical unit 60 is provided between the first optical element unit 16 and the observation optical unit 17, both arranged in the barrel main body 13. Furthermore, a second optical element unit 61 is provided between the magnification-change optical unit 60 and the observation optical unit 17, for branching, at 90°, the light beam that has passed through the magnification-change optical unit 60.

FIG. 7 is an enlarged, perspective view of the magnification-change optical unit 60.

The magnification-change optical unit 60 has a base 62, a holding base 63, two magnification change tubes 64 and 65, and an operation knob 66. The base 62 is secured within the barrel main body 13. The holding base 63 has a parallel cotter 63a fitted in the parallel cotter seat 62a made in the base 62. The base 63 can move in a line that extends at right angles to the above-mentioned optical path L1. The magnification-change tubes 64 and 65 are held on the holding base 63, each containing a group of lenses having different magnifications. The operation knob 66 is operated to move either the tube 64 or the tube 65 into alignment with the optical axis L1. In this embodiment, no lenses are provided in one of the magnification-change tubes, i.e., the tube 64. A group of lenses are provided in the other magnification-change tube 65, for expanding the image twice as large, without changing the image-forming position.

The second optical element unit 61 is substantially identical in structure to the first optical element unit 16 that is shown in FIGS. 2A to 2D. The unit 61 holds a total transmission prism (of the type shown in FIG. 2D), a half prism (of the type shown in FIG. 2C), and a total reflection prism (of the type shown in FIG. 2B). The total transmission prism allows the light beam to propagate straight after passing through the magnification-change optical unit 60. The half prism allows a part of the incident light to propagate straight and branching the remaining part of the light at right angle. The total reflection prism branches all incident light at right angle. The total transmission prism, the half prism, or the total reflection prism is selected and placed in the optical axis L1.

As shown in FIG. 6, a third port 67 is provided on the side of the barrel main body 13, in axial alignment with the branch axis of the second optical element unit 61. The light beam branched by the second optical element unit 61 passes through the relay lens 68 provided in the barrel main body 13 and through the third port 67 and is guided from the barrel main body 13, forming an image at position D.

In the present embodiment, a TV camera unit 34 is attached to the third port 67 by means of a structure that is similar to the adapter/connector structure shown in FIGS. 3A and 3B.

With this arrangement it is possible to observe an image through the TV camera unit 34 even if the looped optical path unit 43 is attached to the first and second ports 32 and 33 of the barrel main body. In addition, the light beam that has passed through the magnification-change optical unit 60 can be branched to the TV camera unit 34 (attached to the third port 67). Hence, the image can be photographed in the magnification that is associated with the magnification set in the binocular section 22. Moreover, the framing field and the TV observation field can be easily set in accordance with the magnification set for observation.

Third Embodiment

The third embodiment of this invention will be described, with reference to FIGS. 8 and 9.

The microscope to which the third embodiment is applied can perform laser-beam machining on a sample S and enables the user to recognize the shape of the sample thus machined.

In this embodiment, the first optical element unit 16 has a total reflection prism 70 as an optical element, in addition to the optical elements 27 to 29 shown in FIGS. 3B to 3D. The prism 70 reflects the light beam coming from the barrel main body 13, toward the second port 33, that is, in the direction opposite to the γ direction as is illustrated in FIG. 8.

Figure 9:
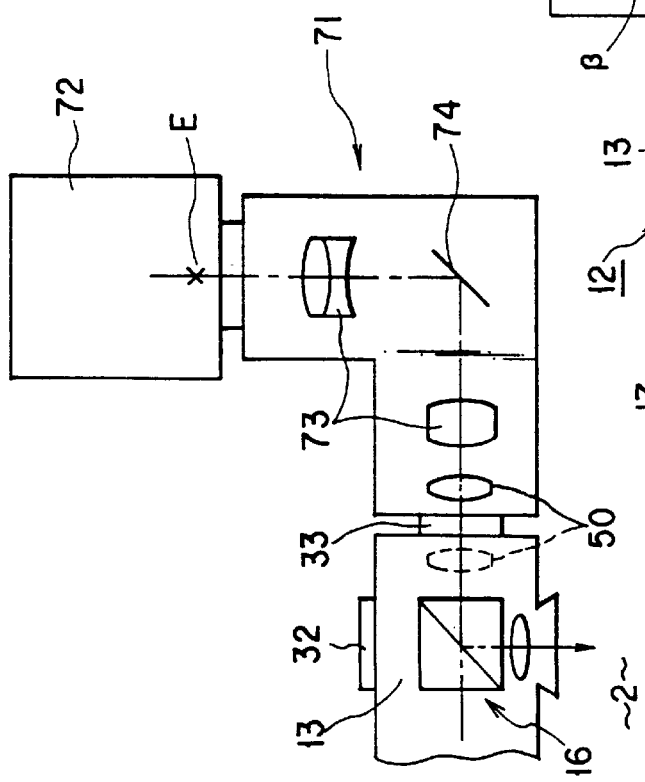
FIG. 9 is a schematic view of the auxiliary lens barrel attached to the lens barrel which is the third embodiment of the invention.

As shown in FIG. 9, an auxiliary lens barrel 71 is attached at one end to the second port 33 of the lens barrel 12. A laser 72 is attached to the other end of the auxiliary lens barrel 71. The laser 72 emits a laser beam from an image-forming position E. The laser beam passes through an optical system 73 and is reflected by a reflection mirror 74, and is applied to the microscope main body 2. The imaging lens 50, which is provided in the auxiliary lens barrel 71, focuses the laser beam on the sample S, with the maximum efficiency.

At this time, the first optical element unit 16 is located in the optical axis of the total reflection prism 70 shown in FIG. 8. The unit 16 therefore prevents the laser beam from leaking into the binocular section 22.

In this arrangement, the first optical element unit 16 is switched to the total reflection prism 27 shown in FIG. 2B. The user observes the sample S with naked eyes through the binocular section 22 and determines a position to which the laser beam should be applied. Thereafter, the first optical element unit 16 is switched to the total reflection prism 70 shown in FIG. 8 and laser-beam machining is carried out. The first optical element unit is further switched to the optical elements shown in FIG. 2B to 2D, whereby the user can observe the sample S that has been machined with the laser beam.

The embodiment may be modified, by replacing the optical element unit 16 with a total reflecting prism for applying light toward the binocular section and a half prism for applying light toward the first and second ports 32 and 33 and by attaching a photographing device, such as a camera or a TV camera, to both the first port 32 and the second port 33. In this case, the operation can be switched between binocular observation and photography achieved by various imaging devices, or vice versa.

In the first to third embodiments described above, the imaging lens 50 is provided in the barrel main body 12 to provide a conjugate imaging position. Instead, the lens 50 may be provided in the confocal optical unit 43 or the reticle-projecting unit 52. This will enhance the cost effectiveness.

As described above, the looped optical path unit 43 is a confocal optical system including a diskscanning optical system. Nonetheless, this unit may be of any another type such as a reticle-projecting unit, a photometry unit, a magnification-change unit or the like.

Moreover, the optical elements provided in the first and second optical element units 16 and 61 are not limited to a total reflection prism, a half prism, and a total transmission prism. Rather, a polarized beam splitter, a dichroic prism (mirror), a band-pass prism (mirror), a half mirror, and the like may be used.

The embodiments have been described with respect to a lens barrel for use in an incident-light microscope. Needless to say, however, they may be used in transmission microscopes as well. In this case, the transmitted illumination optical system only needs to have an illumination lamp 76 and a reflecting mirror 77, as is indicated by the broken lines in FIG. 1. The lamp 76 is provided below the microscope main body 2, for functioning as a light source, and the reflecting mirror 77 guides illumination light from the lamp 76 to the sample S.

Figure 10:
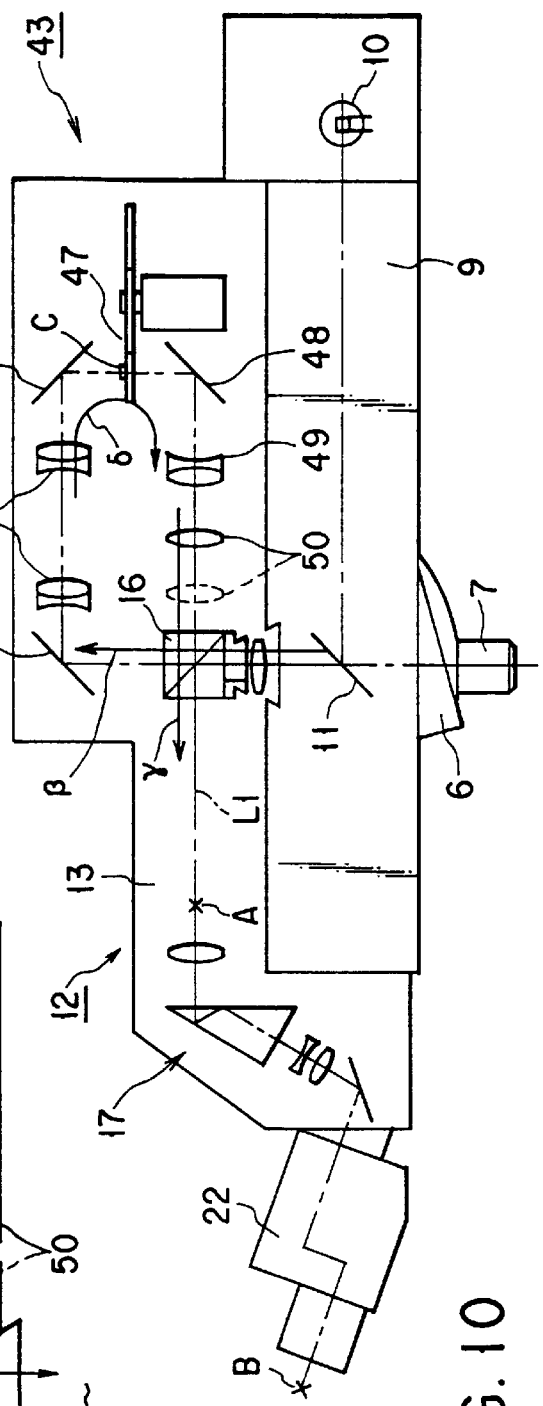
FIG. 10 is a schematic representation of another embodiment of the present invention.

A lens barrel according to the present invention may be a combination of a lens barrel 12 and a looped optical path unit 43, as is illustrated in FIG. 10. This structure can realize an optical system according to the present invention, too.

What is claimed is:

1. An observation lens barrel for use in a microscope, comprising:

a main body for receiving a light beam applied from the microscope and including an image to be observed;

an observation optical system provided in the main body and extending at right angles to a direction in which the light beam from the microscope is focused; and a first optical element provided in the main body, for receiving the light beam from the microscope and emitting a light beam to the observation optical system, wherein said main body has a first port provided on a side opposing the microscope, with the first optical element located between the first port and the microscope, and a second port provided on a side opposing the observation optical system, with the first optical element located between the second port and the observation optical system, and wherein the first optical element comprises an optical element configured to guide the light beam applied from the microscope to the first port, and to guide to the observation optical system a light beam applied from the second port which crosses the light beam guided to the first port.

2. The observation lens barrel according to claim 1, wherein the first port and the second port are adapted to be connected to one of a looped optical path unit and a TV camera unit.

3. The observation lens barrel according to claim 1, further comprising a second optical element configured to guide at least part of the light beam applied from the microscope to the observation optical system, wherein the second optical element is held in the main body such that the first and second optical elements are switchable to be selectively placed at an operation position.

4. The observation lens barrel according to claim 1, further comprising a second optical element configured to guide at least part of the light beam applied from the microscope to the observation optical system, and to guide the light beam applied from the second port to the observation optical system, wherein the second optical element is held in the main body such that the first and second optical elements are switchable to be selectively placed at an operation position.

5. The observation lens barrel according to claim 1, further comprising a second optical element configured to guide to the microscope the light beam applied from the second port, wherein the second optical element is held in the main body such that the first and second optical elements are switchable to be selectively placed at an operation position.

6. The observation lens barrel according to claim 1, wherein another optical element is provided between the first optical element and the observation optical system, both provided in the main body, for branching from the main body the light beam guided into the observation optical system, and a third port is provided on a side of the main body, for allowing passage of the light beam branched by said another optical element.

7. The observation lens barrel according to claim 6, further comprising a magnification-change optical system provided between the first optical element and said another optical element.

8. The observation lens barrel according to claim 1, further comprising a magnification-change optical system.

9. The observation lens barrel according to claim 8, further comprising an imaging lens provided at an incident side of the first optical element, and wherein the magnification-change optical system comprises means for maintaining an image-forming position of the imaging lens.

10. The observation lens barrel according to claim 1, further comprising an imaging lens provided at an incident side of the first optical element for focusing a light beam which has passed an infinity objective lens provided in the microscope.

11. A microscope comprising the observation lens barrel according to claim 1.

12. An observation lens barrel adapted to be attached to a microscope, comprising:
- a main body for receiving a light beam applied from the microscope and including an image to be observed;
- an observation optical system provided in the main body and extending at right angles to a direction in which the light beam from the microscope is focused;
- an optical element provided in the main body and having a first face for receiving the light beam from the microscope and a second face for emitting a light beam to the observation optical system; and
- a looped optical path unit for guiding the light beam from the microscope in a looped path to the observation optical system, while making the light beam cross the light beam from the microscope,
- wherein said optical element comprises a transmission optical element configured to transmit the light beam incident on the first face from the microscope toward the looped path, and to transmit the light beam incident on a face opposite to the second face from the looped path toward the observation optical system.

13. A microscope comprising the observation lens barrel according to claim 12.

14. An observation lens barrel adapted to be attached to a microscope, comprising:
- a main body for receiving a light beam applied from the microscope and including an image to be observed;
- an observation optical system provided in the main body and extending at right angles to a direction in which the light beam from the microscope is focused;
- an optical element provided in the main body and having a first face for receiving the light beam from the microscope and a second face for emitting a light beam to the observation optical system; and
- a looped optical path unit for guiding the light beam from the microscope in a looped path to the observation optical system, while making the light beam cross the light beam from the microscope,
- wherein said optical element comprises:
  - a transmission optical element configured to transmit the light beam incident on the first face from the microscope toward the looped path, and to transmit the light beam incident on a face opposite to the second face from the looped path toward the observation optical system; and
  - a reflection optical element configured to guide the light beam incident on the first face from the microscope directly to the second face, and
- wherein the transmission optical element and the reflection optical element are switchable to be selectively placed at an operation position.

15. A microscope comprising the observation lens barrel according to claim 14.

* * * * *